(12) United States Patent
Umeyama et al.

(10) Patent No.: US 10,615,447 B2
(45) Date of Patent: Apr. 7, 2020

(54) SECONDARY CELL AND MANUFACTURING METHOD THEREOF

(71) Applicant: TOYOTA JIDOSHA KABUSHIKI KAISHA, Aichi-ken (JP)

(72) Inventors: Hiroya Umeyama, Okazaki (JP); Kiyomi Kozuki, Moriguchi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 351 days.

(21) Appl. No.: 15/457,279

(22) Filed: Mar. 13, 2017

(65) Prior Publication Data

US 2017/0271709 A1 Sep. 21, 2017

(30) Foreign Application Priority Data

Mar. 18, 2016 (JP) ................. 2016-055145

(51) Int. Cl.
| | |
|---|---|
| *H01M 10/04* | (2006.01) |
| *B23K 26/082* | (2014.01) |
| *H01M 2/26* | (2006.01) |
| *B23K 35/28* | (2006.01) |
| *B23K 35/30* | (2006.01) |

(Continued)

(52) U.S. Cl.
CPC ....... *H01M 10/0431* (2013.01); *B23K 26/082* (2015.10); *B23K 26/21* (2015.10); *B23K 26/26* (2013.01); *B23K 26/32* (2013.01); *B23K 35/025* (2013.01); *B23K 35/0255* (2013.01); *B23K 35/0261* (2013.01); *B23K 35/286* (2013.01); *B23K 35/302* (2013.01); *H01M 2/263* (2013.01); *B23K 2101/36* (2018.08); *B23K 2103/10* (2018.08); *H01M 2220/20* (2013.01)

(58) Field of Classification Search
CPC ...................................... H01M 2/263
See application file for complete search history.

(56) References Cited

U.S. PATENT DOCUMENTS

| | | | |
|---|---|---|---|
| 6,193,765 B1 * | 2/2001 | Nakanishi ............. | H01M 2/263 29/623.1 |
| 2006/0063068 A1 * | 3/2006 | Cheon ................... | H01M 2/263 429/161 |

(Continued)

FOREIGN PATENT DOCUMENTS

| | | |
|---|---|---|
| JP | 10-261441 A | 9/1998 |
| JP | 2000133241 A | 5/2000 |

(Continued)

*Primary Examiner* — Robert S Carrico
(74) *Attorney, Agent, or Firm* — Sughrue Mion, PLLC

(57) ABSTRACT

A secondary cell manufacturing method includes placing a current collector terminal on a plurality of laminated current collector foils from a lamination direction of the current collector foils. The current collector terminal has a first end portion, and a second end portion forming a cutout with the first end portion. The second end portion includes a base part, and a thin-walled part having a smaller thickness than the base part. The secondary cell manufacturing method includes welding the plurality of current collector foils to the current collector terminal by scanning the plurality of current collector foils disposed in the cutout with a laser beam along the first extension direction toward the second end portion while irradiating the plurality of current collector foils with the laser beam.

7 Claims, 17 Drawing Sheets

(51) Int. Cl.
*B23K 35/02* (2006.01)
*B23K 26/32* (2014.01)
*B23K 26/26* (2014.01)
*B23K 26/21* (2014.01)
*B23K 101/36* (2006.01)
*B23K 103/10* (2006.01)

(56) References Cited

U.S. PATENT DOCUMENTS

2007/0117009 A1    5/2007  Yamauchi et al.
2015/0111090 A1*   4/2015  Lee .................... H01M 4/78
                                              429/163
2017/0179533 A1*   6/2017  Suzuki .............. H01M 2/0237

FOREIGN PATENT DOCUMENTS

| JP | 2007-149353 A | 6/2007 |
| JP | 2007-265846 A | 10/2007 |
| JP | 2007299536 A | 11/2007 |
| KR | 1020150044698 A | 4/2015 |

* cited by examiner

COMPARATIVE EXAMPLE 1

COMPARATIVE EXAMPLE 2

FIG. 19

|  | CELL CAPACITY | DEFECTIVE CELLS |
|---|---|---|
| EXAMPLE 1 | 31.5 Ah | 0 / 30 |
| COMPARATIVE EXAMPLE 1 | 30 Ah | 13 / 30 |
| COMPARATIVE EXAMPLE 2 | 30 Ah | 7 / 30 |

FIG. 20

| LAMINATION THICKNESS OF CURRENT COLLECTOR FOILS t (mm) | THICKNESS OF BASE PART Tb (mm) | RATIO OF THIN-WALLED PART T/t | THICKNESS OF THIN-WALLED PART T (mm) | WELD EVALUATION |
|---|---|---|---|---|
| 0.5 | 1 | 0.1 | 0.05 | B |
| 0.5 | 1 | 0.2 | 0.1 | B |
| 0.5 | 1 | 0.3 | 0.15 | B |
| 0.5 | 1 | 0.4 | 0.2 | B |
| 0.5 | 1 | 0.5 | 0.25 | A |
| 0.5 | 1 | 0.6 | 0.3 | A |
| 0.5 | 1 | 0.7 | 0.35 | A |
| 0.5 | 1 | 0.8 | 0.4 | A |
| 0.5 | 1 | 0.9 | 0.45 | A |
| 0.5 | 1 | 1.0 | 0.5 | A |
| 0.5 | 1 | 1.1 | 0.55 | A |
| 0.5 | 1 | 1.2 | 0.6 | B |
| 0.5 | 1 | 1.3 | 0.65 | B |
| 0.5 | 1 | 1.4 | 0.7 | B |
| 0.5 | 1 | 1.5 | 0.75 | B |

SECONDARY CELL AND MANUFACTURING METHOD THEREOF

INCORPORATION BY REFERENCE

The disclosure of Japanese Patent Application No. 2016-055145 filed on Mar. 18, 2016 including the specification, drawings and abstract is incorporated herein by reference in its entirety.

BACKGROUND

1. Technical Field

The present disclosure relates to a secondary cell and a manufacturing method thereof.

2. Description of Related Art

In relation to a secondary cell and a manufacturing method thereof, for example, Japanese Patent Application Publication No. 10-261441 discloses a non-aqueous electrolyte secondary cell with the object of inexpensively producing a highly-reliable joint between a power generating element and an external terminal of the cell while reducing variation in internal resistance (see JP 10-261441 A).

In the manufacturing method of a non-aqueous electrolyte secondary cell disclosed in JP 10-261441 A, the end edges of electrodes are inserted into grooves of a current collector provided with slits at the top, and the leading ends of the end edges of the electrodes are protruded from the slits. Then, the end edges of the electrodes protruding from the slits are laser-scanned to thereby weld together the electrodes and the current collector.

Japanese Patent Application Publication No. 2007-265846 discloses a cylindrical cell and a manufacturing method thereof with the object of reducing internal resistance by adopting a welding structure that allows a current collector to be stably welded to an exposed core portion (see JP 2007-265846 A).

The cylindrical cell disclosed in JP 2007-265846 A has a spiral electrode group with exposed (positive and negative) core portions, and (positive and negative) current collectors welded to the spiral electrode group. The exposed core portion has a fold-down groove that is formed by partially folding down the exposed core portion from the outer circumferential side toward the center of the spiral electrode group. The current collector has a circular flat main body in which a plurality of substantially U-shaped grooves extending radially from the center is formed. During the manufacturing process of this cylindrical cell, the current collector is disposed on the spiral electrode group so that the substantially U-shaped grooves are fitted into the fold-down grooves. Then, the bottom surface and the side walls of the substantially U-shaped grooves are irradiated with a laser beam to thereby weld the current collector to the spiral electrode group.

Japanese Patent Application Publication No. 2007-149353 discloses a prismatic cell used for high-current applications, such as electric vehicles and hybrid electric vehicles (see JP 2007-149353 A).

The prismatic cell disclosed in JP 2007-149353 A has a rolled flat electrode group, and a retainer plate having a folded part into which a plurality of exposed portions of a positive core or a negative core extending from the electrode group are inserted. During the manufacturing process of this prismatic cell, the plurality of exposed portions are irradiated with a laser beam through a slit formed in the retainer plate to thereby integrally weld together the plurality of exposed portions and the retainer plate.

SUMMARY

As disclosed in JP 10-261441 A, JP 2007-265846 A, and JP 2007-149353 A, secondary cell manufacturing methods are known in which a plurality of laminated current collector foils and a current collector terminal are joined together by welding.

In such secondary cell manufacturing methods, the plurality of current collector foils and the current collector terminal are integrated by being fused and then solidified. However, as the fusion zone of the plurality of current collector foils and the current collector terminal shrinks during solidification, this fusion zone may pull and tear an unfused part of the current collector foils. A tear in the current collector foils can cause an increase in resistance of the secondary cell or a decrease in weld strength.

The present disclosure provides a secondary cell and a manufacturing method thereof in which damage to the current collector foils joined to the current collector terminal by welding is prevented.

A first aspect of the present disclosure relates to a secondary cell manufacturing method including placing a current collector terminal on a plurality of laminated current collector foils from a lamination direction of the current collector foils. The current collector terminal has a first end portion that extends in a first extension direction orthogonal to the lamination direction of the current collector foils, and a second end portion that extends from an end of the first end portion in a second extension direction orthogonal to both the lamination direction of the current collector foils and the first extension direction, has a length in the second extension direction smaller than the length of the first end portion in the first extension direction, and forms a cutout with the first end portion so as to partially expose the current collector foils disposed at ends in the lamination direction of the current collector foils. The second end portion includes a base part, and a thin-walled part that protrudes from the base part in the first extension direction and has a smaller thickness than the base part in the lamination direction of the current collector foils. The secondary cell manufacturing method includes welding the plurality of current collector foils to the current collector terminal by scanning the plurality of current collector foils disposed in the cutout with an energy beam along the first extension direction toward the second end portion while irradiating the plurality of current collector foils with the energy beam. When the plurality of current collector foils are welded to the current collector terminal, the plurality of current collector foils disposed in the cutout and the thin-walled part are fused.

According to the first aspect of the present disclosure, when the plurality of current collector foils are welded to the current collector terminal, the plurality of current collector foils disposed in the cutout and the thin-walled part having a smaller thickness than the base part are fused. Thus, it is possible to reduce the volume of the fusion zone that undergoes solidification shrinkage, and thereby to reduce the tensile stress accompanying solidification shrinkage of the fusion zone. Moreover, it is possible to avoid concentration of the tensile stress accompanying solidification shrinkage of the fusion zone by causing that tensile stress to act on the current collector foils dispersedly at the first end portion side and the second end portion side. Thus, the first aspect of the present disclosure can prevent damage to the current collector foils that are joined to the current collector terminal by welding.

In the first aspect of the present disclosure, when the plurality of current collector foils are welded to the current collector terminal, the plurality of current collector foils protruding from the first end portion in the extension direction of the second end portion may be fused only partially in the extension direction of the second end portion at a position away from the second end portion in the extension direction of the first end portion.

According to the secondary cell manufacturing method thus configured, the current collector terminal and the plurality of current collector foils are not welded together at a position away from the second end portion in the extension direction of the first end portion. Thus, at that position, the current collector foils can be prevented from being subjected to concentrated tensile stress in the extension direction of the second end portion.

In the first aspect of the present disclosure, when the current collector terminal is placed on the plurality of laminated current collector foils, the ratio of a thickness T of the thin-walled part in the lamination direction of the plurality of current collector foils to a thickness t of the current collector foils in the lamination direction of the plurality of current collector foils may satisfy a relation $0.5 \leq T/t \leq 1.1$.

According to the secondary cell manufacturing method thus configured, if the relation $0.5 \leq T/t$ is satisfied, a sufficient volume of the thin-walled part can be secured to more stably weld together the plurality of current collector foils and the current collector terminal. On the other hand, if the relation $T/t \leq 1.1$ is satisfied, the volume of the thin-walled part that undergoes solidification shrinkage can be reduced to more effectively reduce the tensile stress accompanying solidification shrinkage of the fusion zone.

Moreover, in the above aspect of the present disclosure, when the current collector terminal is placed on the plurality of laminated current collector foils, the ratio of a thickness T of the thin-walled part in the lamination direction of the plurality of current collector foils to a thickness t of the current collector foils in the lamination direction of the plurality of current collector foils may satisfy a relation $0.6 \leq T/t \leq 0.9$.

In the first aspect of the present disclosure, the current collector terminal further has a third end portion that is disposed so as to face the second end portion in the first extension direction, extends in a direction orthogonal to both the lamination direction of the current collector foils and the first extension direction, and forms the cutout with the first end portion and the second end portion. The third end portion includes a base part and a thin-walled part. When the plurality of current collector foils are welded to the current collector terminal, the plurality of current collector foils disposed in the cutout are further scanned with an energy beam along the first extension direction toward the third end portion while being irradiated with the energy beam.

According to the secondary cell manufacturing method thus configured, the joint area between the plurality of current collector foils and the current collector terminal is increased, so that the joint strength of the plurality of current collector foils and the current collector terminal can be enhanced.

In the first aspect of the present disclosure, the second end portion may have such a stepped structure that the thickness of the second end portion in the lamination direction of the current collector foils changes discontinuously from the base part toward the thin-walled part.

A second aspect of the present disclosure is a secondary cell including a plurality of laminated current collector foils, and a current collector terminal placed on the plurality of laminated current collector foils in a lamination direction thereof. A cutout is formed in the current collector terminal. The current collector terminal has a first end portion that extends in a direction orthogonal to the lamination direction of the current collector foils, and a second end portion that extends from an end of the first end portion in a direction orthogonal to both the lamination direction of the current collector foils and the extension direction of the first end portion, has a smaller length than the first end portion, and forms the cutout with the first end portion. The secondary cell further includes a weld that is formed along the second end portion as the plurality of current collector foils and the current collector terminal are welded together. At a position away from the second end portion in the extension direction of the first end portion, the plurality of current collector foils protrude from the first end portion in the extension direction of the second end portion and have a fusion mark at a protruding end of the plurality of current collector foils.

According to the secondary cell thus configured, the weld is formed along the second end portion having a smaller length than the first end portion as the plurality of current collector foils and the current collector terminal are welded together. Thus, during the welding step of forming the weld, it is possible to avoid concentration of the tensile stress accompanying solidification shrinkage of the fusion zone of the plurality of current collector foils and the current collector terminal by causing that tensile stress to act on the current collector foils dispersedly at the first end portion side and the second end portion side. At a position away from the second end portion in the extension direction of the first end portion, the plurality of current collector foils protrude from the first end portion in the extension direction of the second end portion and have the fusion mark at the protruding end. Thus, during the welding step of forming the weld, the current collector foils can be prevented from being subjected to concentrated tensile stress in the extension direction of the second end portion at a position away from the second end portion in the extension direction of the first end portion. Accordingly, the present disclosure can prevent damage to the current collector foils, and thereby enhance the joint strength of the current collector foils and the current collector terminal or reduce the resistance of the secondary cell.

In the second aspect of the present disclosure, the current collector terminal may further have a third end portion that is disposed so as to face the second end portion in the first extension direction, extends in a direction orthogonal to both the lamination direction of the current collector foils and the first extension direction, and forms the cutout with the first end portion and the second end portion. The secondary cell may further include a weld that is formed along the third end portion as the plurality of current collector foils and the current collector terminal are welded together.

According to the present disclosure, as has been described above, a secondary cell and a manufacturing method thereof can be provided in which damage to the current collector foils that are joined to the current collector terminal by welding is prevented.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 19 is a table showing evaluation results of the secondary cells of Example 1, Comparative Example 1, and Comparative Example 2; and FIG. 20 is a table showing evaluation results of secondary cells of Example 2.

DETAILED DESCRIPTION OF EMBODIMENTS

Figure 1:
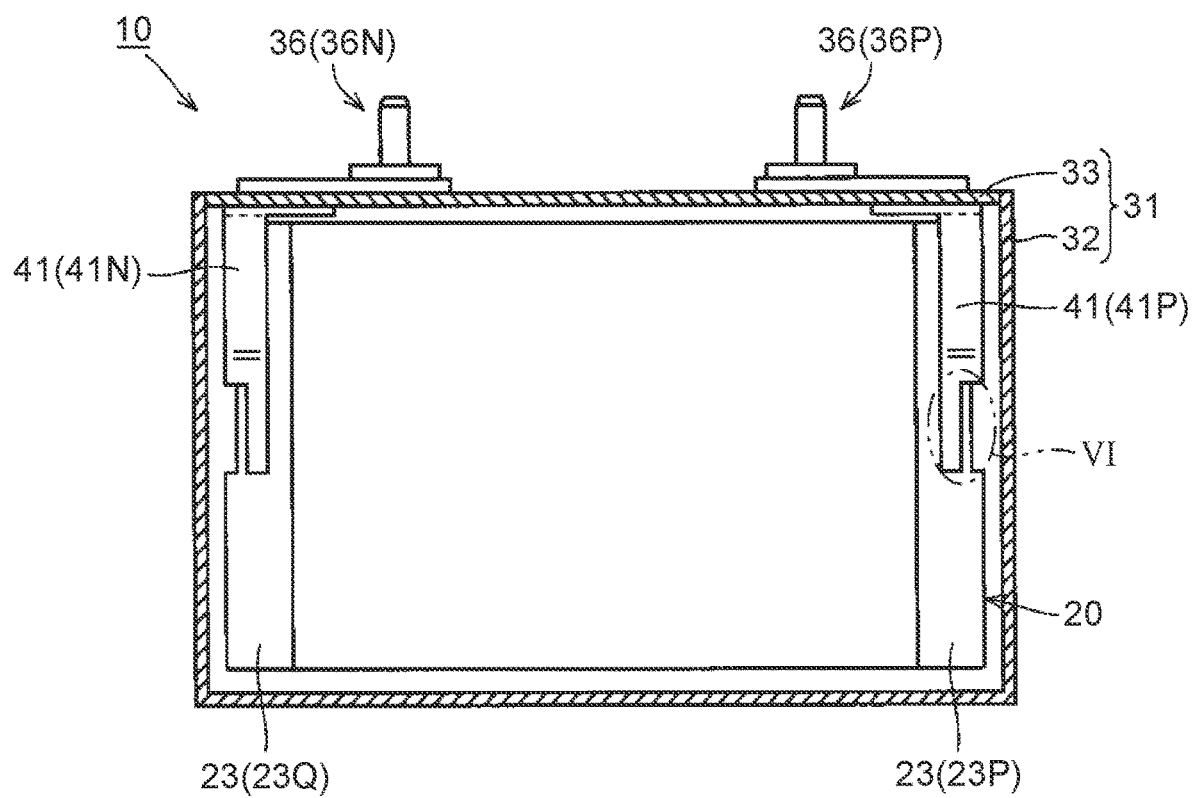
FIG. 1 is a sectional view showing a secondary cell manufactured by a secondary cell manufacturing method of a first embodiment.

Embodiments of the present disclosure will be described with reference to the drawings. In the drawings to be referred to below, the same or equivalent members are denoted by the same reference sign.

(First Embodiment)

FIG. 1 is a sectional view showing a secondary cell manufactured by a secondary cell manufacturing method of a first embodiment of the present disclosure. First, the structure of a secondary cell 10 manufactured by the secondary cell manufacturing method of this embodiment will be described with reference to FIG. 1.

The secondary cell 10 is installed, for example, in an electric vehicle, an externally chargeable plug-in hybrid electric vehicle, or a hybrid electric vehicle powered by an internal combustion engine, such as a gasoline engine or a diesel engine, and a motor supplied with electricity from a chargeable-dischargeable battery.

The secondary cell 10 has an electrode 20, a case body 31, a positive external terminal 36P and a negative external terminal 36N, and a positive current collector terminal 41P and a negative current collector terminal 41N (hereinafter, where no distinction is made between the positive external terminal 36P and the negative external terminal 36N, these external terminals will be referred to simply as "external terminals 36," and where no distinction is made between the positive current collector terminal 41P and the negative current collector terminal 41N, these current collector terminals will be referred to simply as "current collector terminals 41"). The case body 31 defines the external form of the secondary cell 10. The case body 31 is made of metal such as aluminum. The case body 31 is assembled from a main body 32 and a lid 33. The main body 32 has the shape of a substantially rectangular parallelepiped casing that is open at one side. The lid 33 is provided so as to cover the opening of the main body 32. The positive external terminal 36P and the negative external terminal 36N are mounted on the lid 33.

Figure 2:
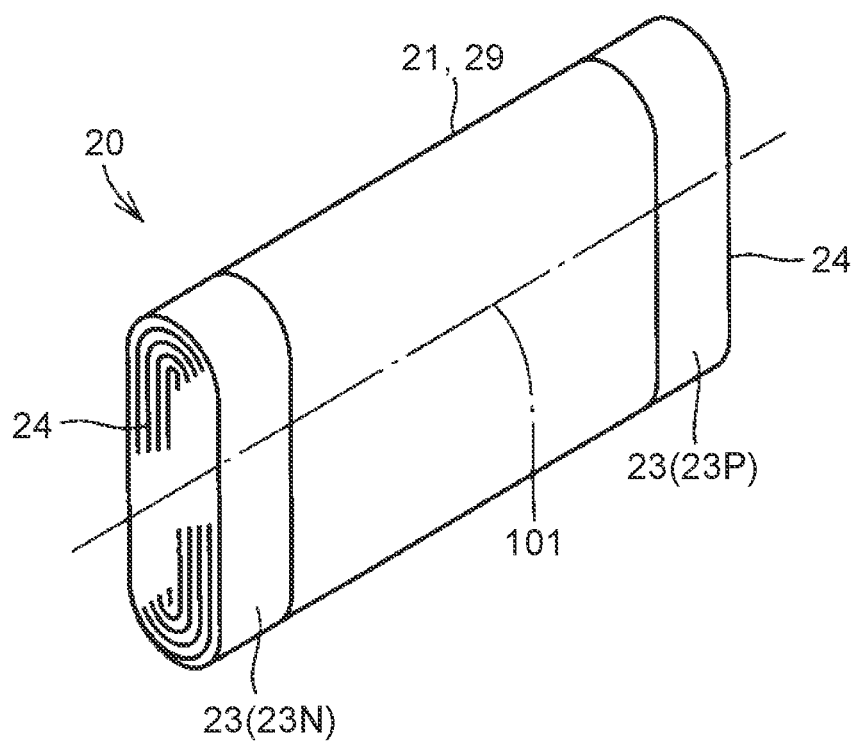
FIG. 2 is a perspective view showing an electrode of the secondary cell of FIG. 1 as a single body.
Figure 3:
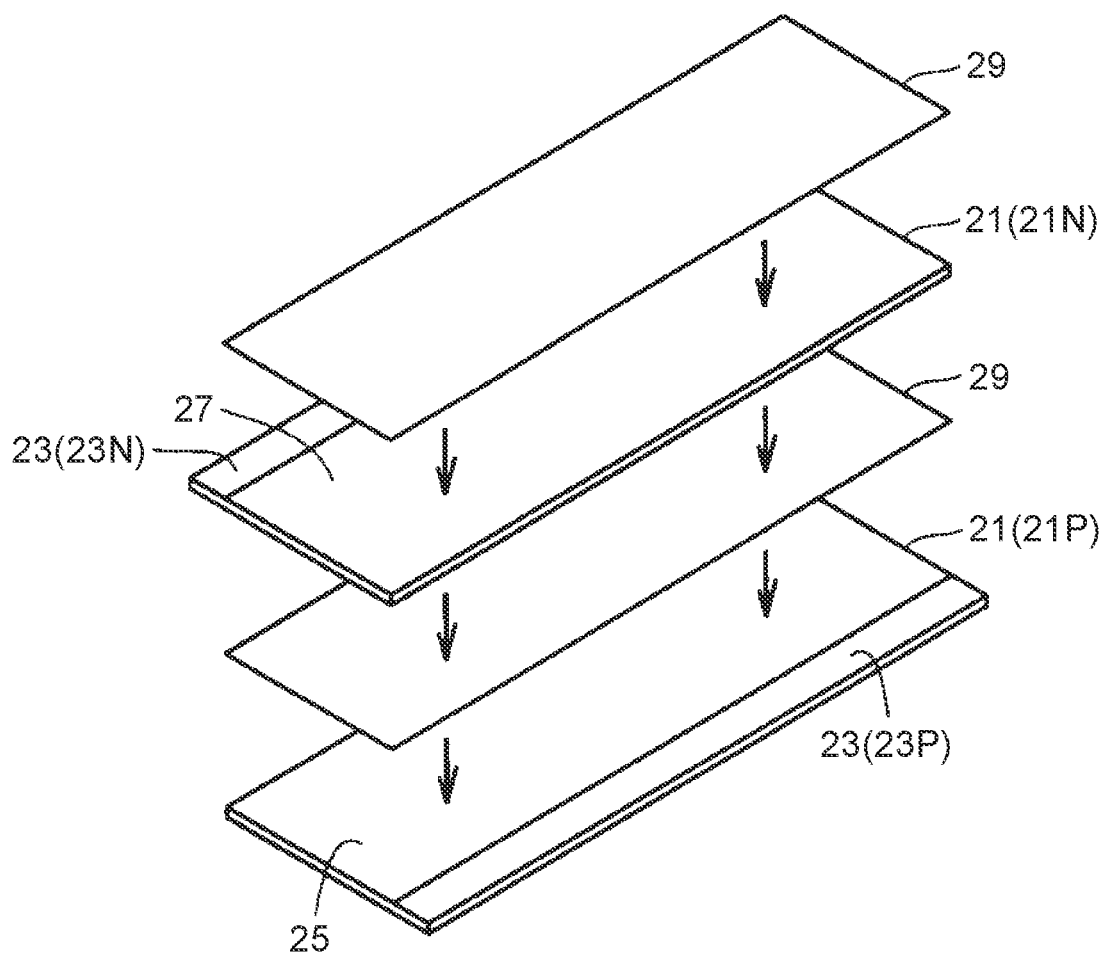
FIG. 3 is an exploded view showing the electrode of FIG. 2.

FIG. 2 is a perspective view showing the electrode of the secondary cell of FIG. 1 as a single body. FIG. 3 is an exploded view showing the electrode of FIG. 2. Referring to FIG. 1 to FIG. 3, the electrode 20 is housed inside the case body 31 along with an electrolyte. The electrode 20 is composed of a positive current collector foil 21P, separators 29, and a negative current collector foil 21N laid on the positive current collector foil 21P through the separator 29 (hereinafter, where no distinction is made between the positive current collector foil 21P and the negative current collector foil 21N, these current collector foils will be referred to simply as "current collector foils 21"). The positive current collector foil 21P is formed by a substantially rectangular aluminum foil. A paste 25 containing a positive active material is applied on both sides of the positive current collector foil 21P. A peripheral edge portion 23P on which the paste 25 is not applied is formed so as to extend in the form of a strip at one of peripheral edges of the positive current collector foil 21P that extend in the long-side direction.

The negative current collector foil 21N is formed by a copper foil of the same shape as the positive current collector foil 21P. A paste 27 containing a negative active material is applied on both sides of the negative current collector foil 21N. A peripheral edge portion 23N on which the paste 27 is not applied is formed so as to extend in the shape of a strip at one of peripheral edges of the negative current collector foil 21N that extend in the long-side direction (hereinafter, where no distinction is made between the peripheral edge portion 23P and the peripheral edge portion 23N, these peripheral edge portions will be referred to as "peripheral edge portions 23"). The separator 29 has a substantially rectangular shape with the length in the short-side direction smaller than that of the positive current collector foil 21P and the negative current collector foil 21N. For example, a porous polypropylene resin sheet can be used as the separator 29.

The positive current collector foil 21P, the negative current collector foil 21N, and the two separators 29 are laid one on top of another, in the order of the positive current collector foil 21P, one separator 29, the negative current collector foil 21N, and the other separator 29. As a result, the region of the positive current collector foil 21P on which the paste 25 is applied and the region of the negative current collector foil 21N on which the paste 27 is applied face each other through the separator 29. The peripheral edge portion 23P of the positive current collector foil 21P is exposed from one of end sides of the separator 29 that extend in the long-side direction, while the peripheral edge portion 23N of the negative current collector foil 21N is exposed from the other of the end sides of the separator 29 that extend in the long-side direction.

The electrode 20 is of a rolled type, with the laminate of the positive current collector foil 21P, the negative current collector foil 21N, and the two separators 29 being rolled around an imaginary central axis 101 shown in FIG. 2. This laminate is rolled so that the shape of a section cut along a plane orthogonal to the central axis 101 has the shape of a track (a shape formed by combining a rectangle and two semicircles).

The positive current collector terminal 41P electrically connects the positive external terminal 36P and the positive current collector foil 21P to each other. The negative current collector terminal 41N electrically connects the negative external terminal 36N and the negative current collector foil 21N to each other.

The current collector terminal 41 is made of a conductive metal. The positive current collector terminal 41P is made of the same type of metal as the metal of which the positive current collector foil 21P is made. The negative current collector terminal 41N is made of the same type of metal as the metal of which the negative current collector foil 21N is made. The positive current collector terminal 41P is made of aluminum that is characterized by being resistant to corrosion even at high potential and having low specific resistance. The negative current collector terminal 41N is made of copper that is characterized by having low specific resistance and not alloying with lithium (Li).

Figure 4:
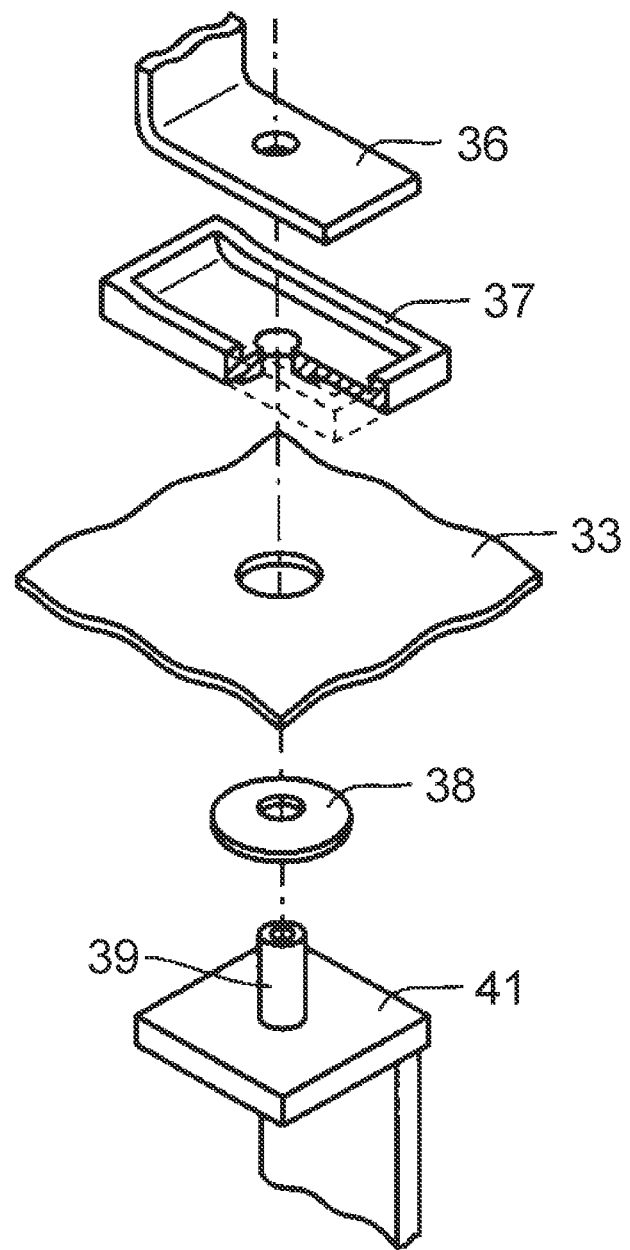
FIG. 4 is an exploded view showing a structure for connecting an external terminal and a current collector terminal of FIG. 1 to each other.
Figure 5:
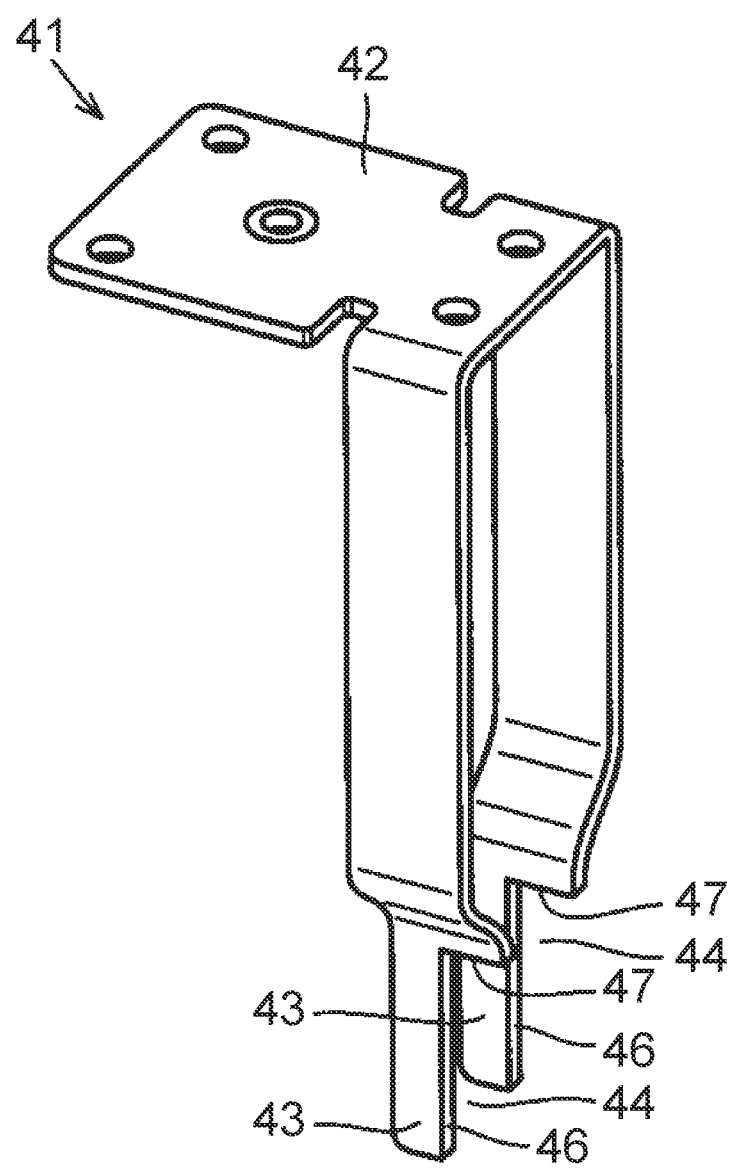
FIG. 5 is a perspective view showing the current collector terminal of the secondary cell of FIG. 1 as a single body.

FIG. 4 is an exploded view showing a structure for connecting the external terminal and the current collector terminal of FIG. 1 to each other. FIG. 5 is a perspective view showing the current collector terminal of the secondary cell of FIG. 1 as a single body.

Referring to FIG. 1 to FIG. 5, the external terminal 36 is placed on the lid 33 through an insulator 37 from the outside of the case body 31. The current collector terminal 41 is placed on the lid 33 through an insulator 38 from the inside of the case body 31. As a conductive pin member 39 is inserted from the current collector terminal 41 to the external terminal 36, the current collector terminal 41 and the external terminal 36 are electrically connected to each other.

The structure for connecting the positive external terminal 36P and the negative current collector terminal 41P to each other and the structure for connecting the negative external terminal 36N and the negative current collector terminal 41N to each other are the same.

The current collector terminal 41 has a plate-like part 42 and a pair of arms 43 as constituent portions. The plate-like part 42 has a plate shape. The plate-like part 42 is a portion of the current collector terminal 41 that is placed on the lid 33. The arm 43 is folded from the plate-like part 42 and extends in the shape of an arm in a direction away from the plate-like part 42. The pair of arms 43 face each other with a clearance left therebetween. The pair of arms 43 are portions of the current collector terminal 41 that are connected to the electrode 20 (current collector foils 21).

The positive current collector terminal 41P is provided so that the pair of arms 43 thereof clamp the part where the peripheral edge portion 23P of the positive current collector foil 21P is layered. The negative current collector terminal 41N is provided so that the pair of arms 43 thereof clamp the part where the peripheral edge portion 23N of the negative current collector foil 21N is layered.

The structure for connecting the positive current collector terminal 41P and the positive current collector foil 21P to each other and the structure for connecting the negative current collector terminal 41N and the negative current collector foil 21N to each other are the same.

Figure 6:
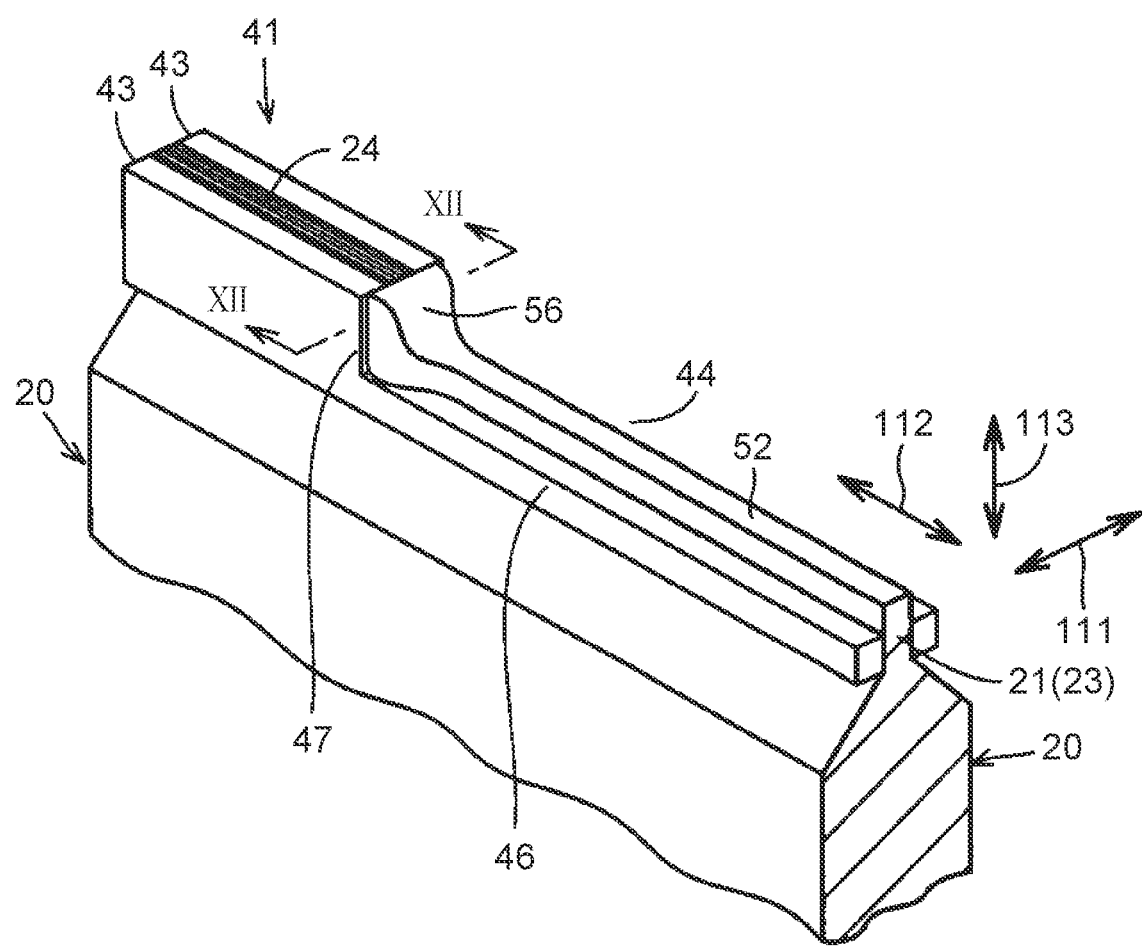
FIG. 6 is an enlarged perspective view of the area encircled by the two-dot dashed line VI in FIG. 1.

FIG. 6 is an enlarged perspective view of the area encircled by the two-dot dashed line VI in FIG. 1. Referring to FIG. 6, the plurality of current collector foils 21 are laminated in layers in the direction indicated by an arrow 111 (hereinafter also referred to as a "lamination direction of the current collector foils 21"). The current collector terminal 41 (arms 43) is placed on the peripheral edge portion 23 of the plurality of laminated current collector foils 21 from the lamination direction of the current collector foils 21.

A cutout 44 is formed in the current collector terminal 41 (arms 43). When the current collector terminal 41 is seen from the lamination direction of the current collector foils 21, the cutout 44 is formed so as to reduce the width of the arms 43 (the length of the arms 43 in a direction orthogonal to the direction in which the arms 43 extend in the shape of an arm).

When the current collector terminal 41 is seen from the lamination direction of the current collector foils 21, the cutout 44 has a substantially rectangular shape with the long side extending along the direction indicated by an arrow 112 and the short side extending along the direction indicated by an arrow 113. The long-side direction of the cutout 44 is the direction in which the arms 43 extend in the shape of an arm. The long-side direction of the cutout 44 is orthogonal to the lamination direction of the current collector foils 21. The short-side direction of the cutout 44 is orthogonal to both the long-side direction of the cutout 44 and the lamination direction of the current collector foils 21.

The current collector terminal 41 has a first end portion 46 and a second end portion 47. The first end portion 46 extends in the direction (direction indicated by the arrow 112) orthogonal to the lamination direction of the current collector foils 21 (hereinafter the direction indicated by the arrow 112 will be also referred to as a "first extension direction"). The second end portion 47 extends from an end of the first end portion 46 in the direction (direction indicated by the arrow 113) orthogonal to both the lamination direction of the current collector foils 21 and the first extension direction (hereinafter the direction indicated by the arrow 113 will be also referred to as a "second extension direction"). When the current collector terminal 41 is seen from the lamination direction of the current collector foils 21, the length of the second end portion 47 is smaller than the length of the first end portion 46. That is, the length of the second end portion 47 in the second extension direction is smaller than the length of the first end portion 46 in the first extension direction. The cutout 44 is formed by the first end portion 46 and the second end portion 47.

In FIG. 6, the end of the plurality of laminated current collector foils 21 (peripheral edge portion 23) is aligned with the end of the current collector terminal 41 at the base side (the side of the plate-like part 42 in FIG. 5) of the arms 43 from the cutout 44. However, the present disclosure is not limited to this configuration, and the end of the plurality of laminated current collector foils 21 may protrude from the end of the current collector terminal 41.

The plurality of current collector foils 21 are joined to the current collector terminal 41 (arms 43) by welding.

More specifically, the secondary cell 10 has a weld 56. The weld 56 is a part where the plurality of current collector foils 21 and the current collector terminal 41 are joined together by welding. The weld 56 is a part where the plurality of current collector foils 21 and the current collector terminal 41 are integrated by being fused and then solidified.

The weld 56 is formed along the second end portion 47. In the lamination direction of the current collector foils 21 indicated by the arrow 111, the weld 56 is formed across one arm 43, the plurality of current collector foils 21, and the other arm 43. In the lamination direction of the current collector foils 21 indicated by the arrow 111, the weld 56 has a larger thickness than the plurality of current collector foils 21. The weld 56 is formed so as to extend from a corner of the first end portion 46 and the second end portion 47 in a direction away from the first end portion 46.

At a position away from the second end portion 47 in the first extension direction (long-side direction of the cutout 44), the plurality of current collector foils 21 protrude from the first end portion 46 in the second extension direction (short-side direction of the cutout 44) indicated by the arrow 113. The length of a part of the plurality of current collector foils 21 protruding from the first end portion 46 is smaller than the length of the second end portion 47. The plurality of current collector foils 21 have a fusion mark 52 at the end protruding from the first end portion 46. The fusion mark 52 is a trace of fusion of the plurality of current collector foils 21, and is formed as the plurality of current collector foils 21 are fused and then solidified.

The fusion mark 52 extends between one arm 43 and the other arm 43 in the shape of a strip in the first extension direction indicated by the arrow 112. The fusion mark 52 extending in the first extension direction continues at one end to the weld 56. In the area where the fusion mark 52 extends in the first extension direction, the arms 43 of the current collector terminal 41 and the plurality of current collector foils 21 are not joined together by welding.

Figure 7:
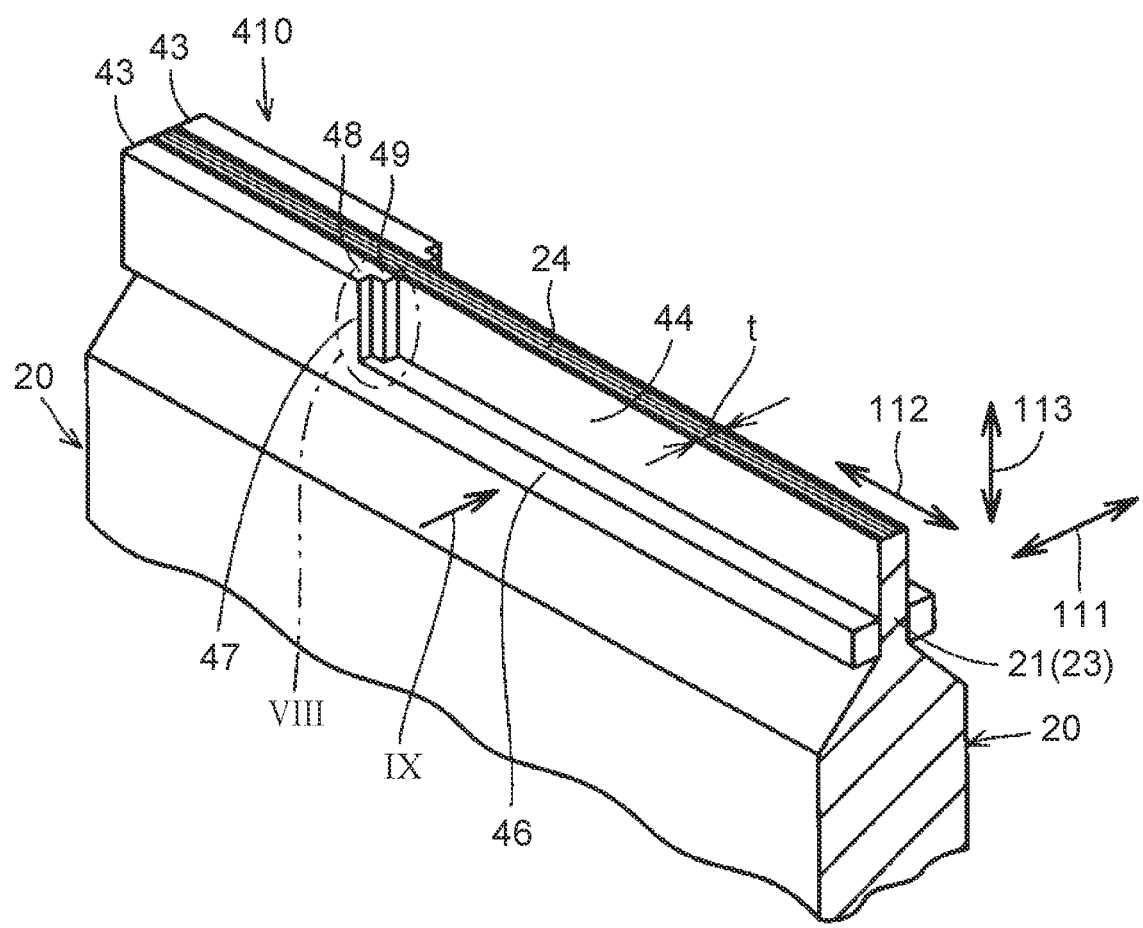
FIG. 7 is a perspective view showing a step in the manufacturing method of the secondary cell of FIG. 1.
Figure 8:
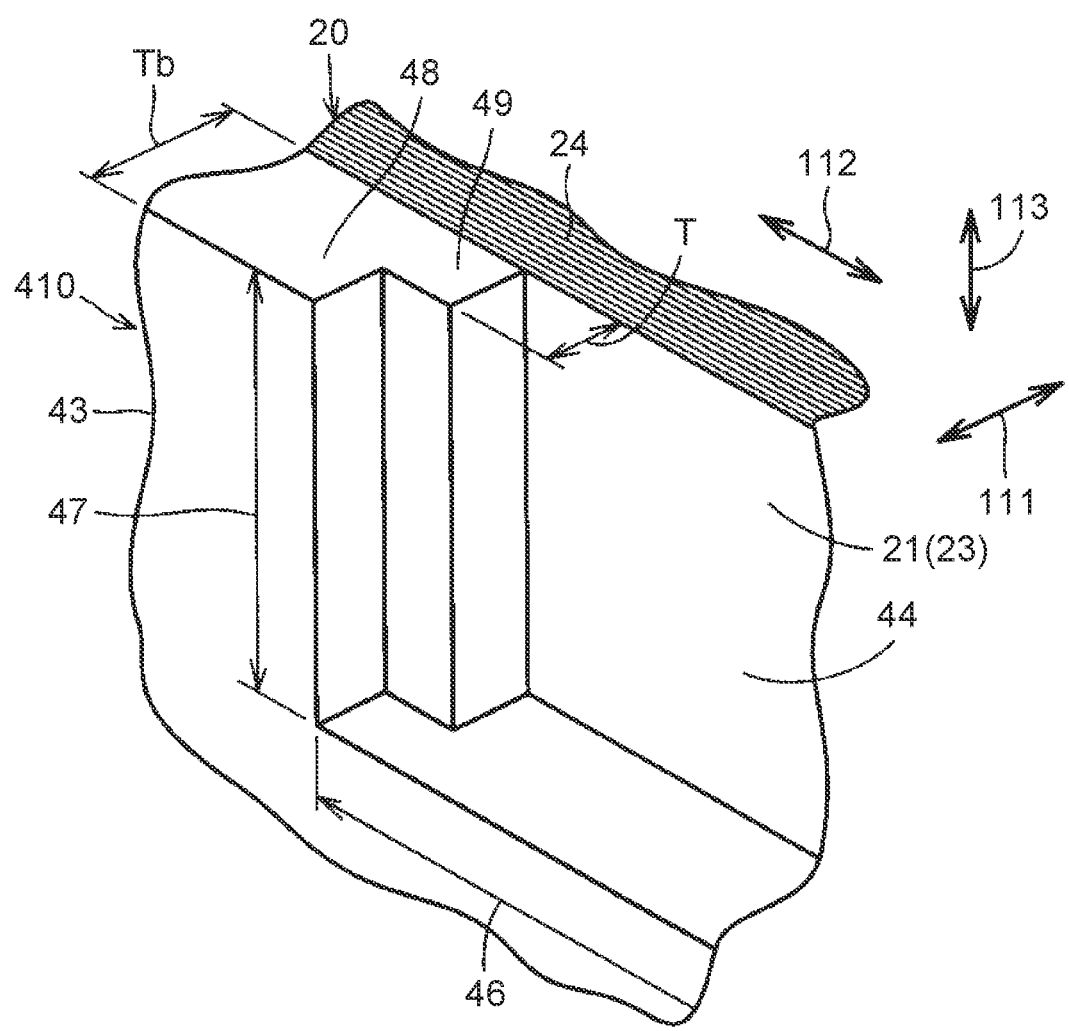
FIG. 8 is an enlarged perspective view of the area encircled by the two-dot dashed line VIII in FIG. 7.

Next, the secondary cell manufacturing method of the first embodiment of the present disclosure will be described. FIG. 7 is a perspective view showing a step in the manufacturing method of the secondary cell of FIG. 1. FIG. 7 shows an area corresponding to FIG. 6. FIG. 8 is an enlarged perspective view of the area encircled by the two-dot dashed line VIII in FIG. 7.

Referring to FIG. 7 and FIG. 8, first, a laminate of the positive current collector foil 21P, the negative current collector foil 21N, and the two separators 29 (see FIG. 2) is rolled to produce the electrode 20. Next, the current collector terminal 41 is placed on the peripheral edge portion 23 of the plurality of laminated current collector foils 21 from the lamination direction of the current collector foils 21 indicated by the arrow 111. In this embodiment, the peripheral edge portion 23 of the plurality of laminated current collector foils 21 is clamped by the pair of arms 43 of a current collector terminal 410.

The current collector terminal 410 of FIG. 7 becomes the current collector terminal 41 of FIG. 6 through a subsequent welding step. The current collector terminal 410 and the current collector terminal 41 have basically the same structure except for the shape of the second end portion 47. In the following, the structure of the current collector terminal 410 will be described, though the description partially overlaps that of the current collector terminal 41.

The cutout 44 is formed in the current collector terminal 410. The cutout 44 is formed so as to partially expose the current collector foils 21 that are disposed at the farthest ends in the lamination direction of the current collector foils 21. The exposed portion of the current collector foils 21 is a portion of a surface of the current collector foils 21 that are disposed at the farthest ends in the lamination direction of the current collector foils 21 and is not covered with the current collector terminal 410.

The current collector terminal 410 has the first end portion 46 and the second end portion 47. The first end portion 46 extends in the first extension direction (direction indicated by the arrow 112) orthogonal to the lamination direction of the current collector foils 21. The first end portion 46 extends at a direction away from an end 24 of the laminated current collector foils 21. The first end portion 46 extends along the end 24 of the laminated current collector foils 21. The second end portion 47 extends from the end of the first end portion 46 in the direction (direction indicated by the arrow 113) orthogonal to both the lamination direction of the current collector foils 21 and the first extension direction. The second end portion 47 extends from the end of the first end portion 46 toward the end 24 of the current collector foils 21. When the current collector terminal 410 is seen from the lamination direction of the current collector foils 21, the length of the second end portion 47 is smaller than the length of the first end portion 46. That is, the length of the second end portion 47 in the second extension direction is smaller than the length of the first end portion in the first extension direction. The cutout 44 is formed by the first end portion 46 and the second end portion 47.

The second end portion 47 has a base part 48 and a thin-walled part 49. The base part 48 is in contact with the current collector foils 21 between the first end portion 46 and the end 24 of the current collector foils 21 in the second extension direction. The base part 48 has the same thickness as the first end portion 46 in the lamination direction of the current collector foils 21.

The thin-walled part 49 protrudes from the base part 48 in the first extension direction. The thin-walled part 49 is in contact with the current collector foils 21 between the first end portion 46 and the end 24 of the current collector foils 21 in the second extension direction. The thin-walled part 49 has a smaller thickness than the base part 48 in the lamination direction of the current collector foils 21 (in FIG. 8, T<Tb). The thin-walled part 49 forms a stepped structure by being recessed in the lamination direction of the current collector foils 21 from a surface of the base part 48 opposite from the side facing the current collector foils 21.

In this embodiment, the end 24 of the plurality of laminated current collector foils 21 is aligned with the end of the current collector terminal 41, but the present disclosure is not limited to this configuration, and the end 24 may protrude from the end of the current collector terminal 41.

Figure 9:
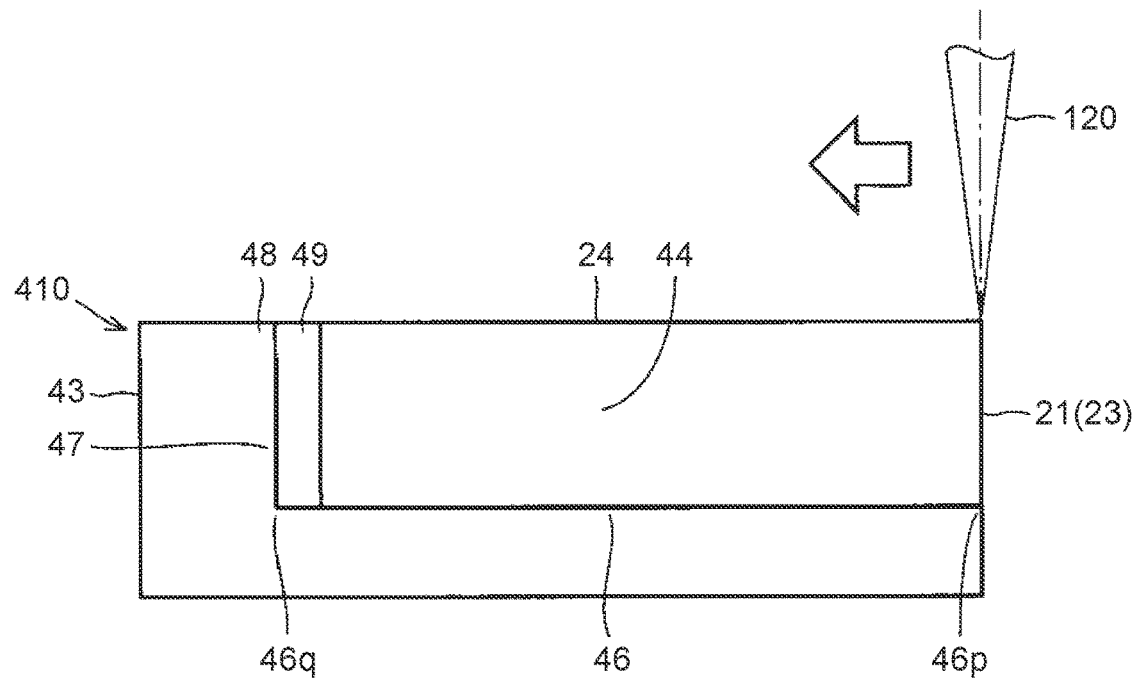
FIG. 9 is a view showing a step in the manufacturing method of the secondary cell of FIG. 1.
Figure 10:
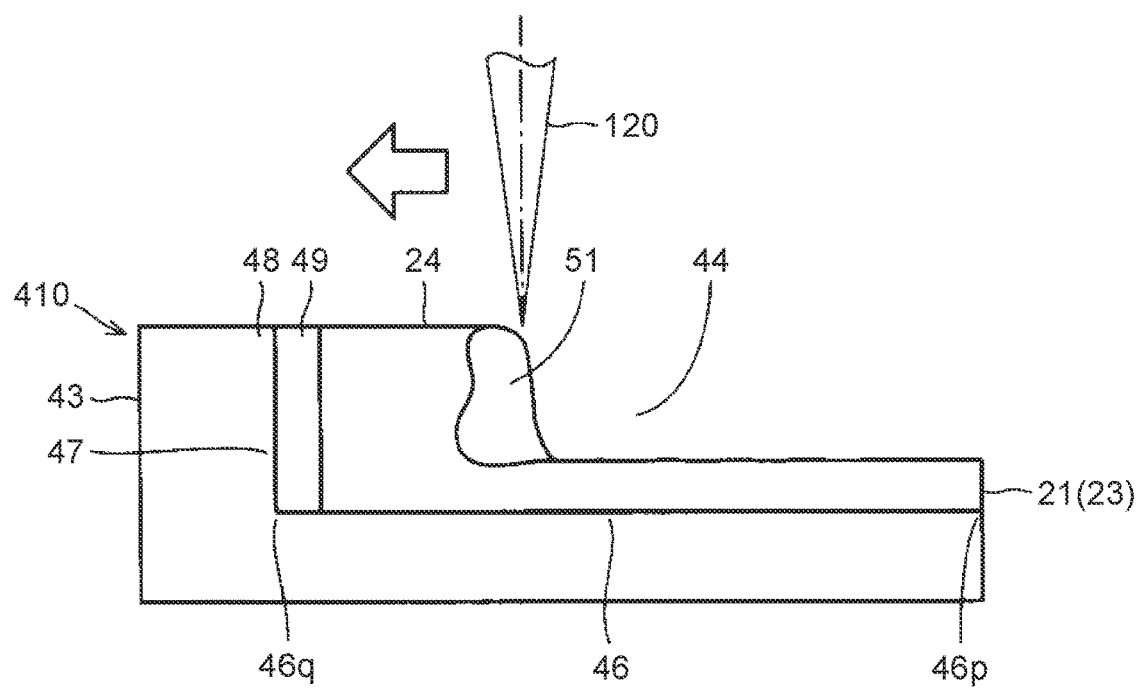
FIG. 10 is a view showing a step in the manufacturing method of the secondary cell of FIG. 1.
Figure 11:
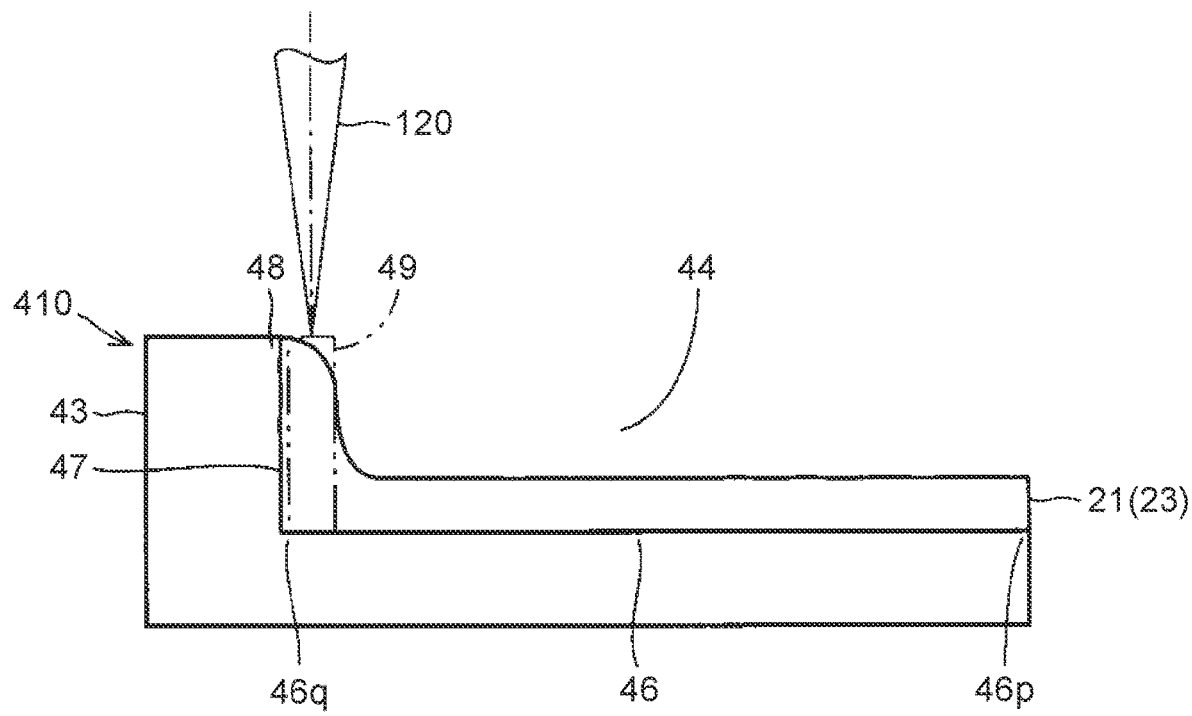
FIG. 11 is a view showing a step in the manufacturing method of the secondary cell of FIG. 1.

FIG. 9 to FIG. 11 are views showing steps in the manufacturing method of the secondary cell of FIG. 1. These drawings show the step of welding together the electrode 20 (current collector foils 21) and the current collector terminal 410 as seen from the direction indicated by the arrow IX in FIG. 7.

Referring to FIG. 9 to FIG. 11, the plurality of current collector foils 21 are welded to the current collector terminal 410 by scanning the plurality of current collector foils 21 disposed in the cutout 44 with a laser beam 120 along the first extension direction toward the second end portion 47 while irradiating the plurality of current collector foils 21 with the laser beam 120. In this welding step, the plurality of current collector foils 21 disposed in the cutout 44 and the thin-walled part 49 are fused.

More specifically, first, as shown in FIG. 9, the end 24 of the plurality of current collector foils 21 disposed in the cutout 44 is irradiated with the laser beam 120, directly above an end 46p of the first end portion 46 (the end opposite from an end 46q located on the side at which the second end portion 47 intersects the first end portion 46 in the first extension direction).

As shown in FIG. 10, the end 24 is scanned with the laser beam from the end 46p to the end 46q of the first end portion 46 while being irradiated with the laser beam.

In this process, the power output and/or the scanning speed of the laser beam are adjusted so that the plurality of current collector foils 21 protruding from the first end portion 46 in the second extension direction are fused only partially in the second extension direction. As the plurality of current collector foils 21 are fused partially in the second extension direction and then solidified, the fusion mark 52 shown in FIG. 6 is left at a position away from the second end portion 47 in the first extension direction.

A part (fused mass 51) of the plurality of current collector foils 21 fused by laser beam irradiation moves with the scanning laser beam, in the scanning direction of the laser beam. While growing in size, the fused mass 51 moves from the end 46p toward the end 46q of the first end portion 46.

As shown in FIG. 11, when the laser beam irradiation approaches the end 46q of the first end portion 46, the plurality of current collector foils 21 disposed in the cutout 44 and the thin-walled part 49 are fused. The fused mass 51 having moved from the end 46p toward the end 46q of the first end portion 46 adds to the fusion, and the fusion zone of the plurality of current collector foils 21 and the thin-walled part 49 is solidified, so that the weld 56 shown in FIG. 6 is formed at the second end portion 47.

The positive current collector terminal 41P and the negative current collector terminal 41N are connected to the electrode 20 by the above welding step. The pin member 39, insulator 38, lid 33, insulator 37, and external terminal 36 shown in FIG. 4 are attached to the current collector terminal 41 having been integrated with the electrode 20. As shown in FIG. 1, the electrode 20 integrated with the external terminals 36 and the lid 33 is housed inside the main body 32 of the case body 31, and the lid 33 is welded to the main body 32. An electrolyte is injected into the case body 31 through an injection hole provided in the lid 33, and then the injection hole is covered. These steps complete the secondary cell 10 of FIG. 1.

In the above welding step, the plurality of current collector foils 21 and the current collector terminal 41 are integrated by being fused and then solidified. However, as the fusion zone of the plurality of current collector foils 21 and the current collector terminal 410 shrinks during solidification, this fusion zone may pull and tear an unfused part of the current collector foils 21. To diminish this possibility, in this embodiment, the volume of the fusion zone that undergoes solidification shrinkage is reduced by providing the thin-walled part 49 in the second end portion 47 of the current collector terminal 410 and fusing the thin-walled part 49. Thus, the tensile stress accompanying solidification shrinkage of the fusion zone can be reduced.

In this embodiment, the plurality of current collector foils 21 and the current collector terminal 410 are integrated by being fused and then solidified at the second end portion 47. Thus, it is possible to cause the tensile stress accompanying solidification shrinkage of the fusion zone to act dispersedly on the current collector foils 21 at the side of the first end portion 46 and the current collector foils 21 at the side of the second end portion 47. Accordingly, concentration of the tensile stress acting on the current collector foils 21 can be avoided.

In this embodiment, the plurality of current collector foils 21 protruding from the first end portion 46 in the second extension direction are fused only partially in the second extension direction at a position away from the second end portion 47 in the first extension direction. Thus, it is possible to prevent the tensile stress in the second extension direction from acting on the current collector foils 21 that are covered by the current collector terminal 410 directly under the first end portion 46.

For the above reasons, the present disclosure can prevent a tear in the current collector foils 21 due to solidification shrinkage of the fusion zone of the plurality of current collector foils 21 and the current collector terminal 410 during the step of welding together the electrode 20 and the current collector terminal 410.

Figure 12:
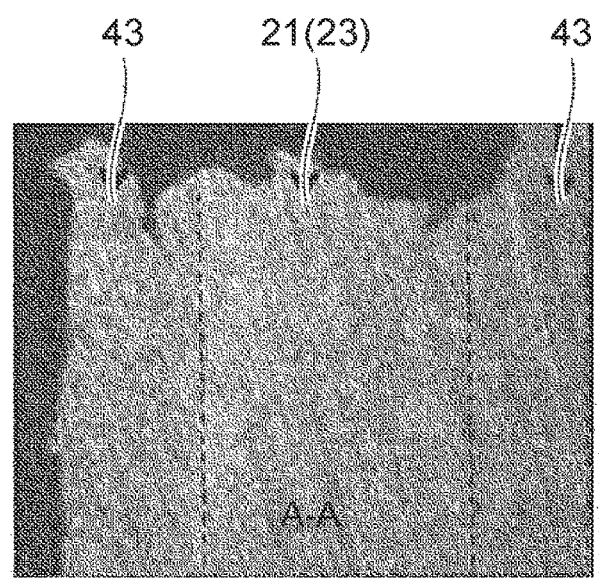
FIG. 12 is a picture showing a section of the secondary cell along the line XII-XII in FIG. 6.

FIG. 12 is a picture showing a section of the secondary cell along the line XII-XII of FIG. 6. Referring to FIG. 12, tearing of the current collector foils 21 was prevented when the secondary cell was produced by the secondary cell manufacturing method of this embodiment.

Referring to FIG. 7 and FIG. 8, it is preferable that the ratio of a thickness T of the thin-walled part 49 in the lamination direction of the plurality of current collector foils 21 to a thickness t of the current collector foils 21 in the lamination direction thereof satisfy a relation $0.5 \leq T/t \leq 1.1$.

If the relation $0.5 \leq T/t$ is satisfied, a sufficient volume of the thin-walled part 49 can be secured to more stably weld together the plurality of current collector foils 21 and the current collector terminal 410. On the other hand, if the relation $T/t \leq 1.1$ is satisfied, the volume of the thin-walled part 49 that undergoes solidification shrinkage can be reduced to more effectively reduce the tensile stress accompanying solidification shrinkage of the fusion zone of the plurality of current collector foils 21 and the current collector terminal 410. Thus, it is possible to improve the quality of the weld joining together the electrode 20 and the current collector terminal 410.

It is more preferable that the ratio of the thickness T of the thin-walled part 49 in the lamination direction of the plurality of current collector foils 21 to the thickness t of the current collector foils 21 in the lamination direction thereof satisfy a relation $0.6 \leq T/t \leq 0.9$.

To summarize the configurations of the secondary cell manufacturing method and the secondary cell of the first embodiment of the present disclosure having been described above, the manufacturing method of the secondary cell 10 of this embodiment includes the step of placing the current collector terminal 410 on the plurality of laminated current collector foils 21 from the lamination direction of the current collector foils 21. The cutout 44 is formed in the current collector terminal 410 so as to partially expose the current collector foils 21 disposed at the ends in the lamination direction of the current collector foils 21. The current collector terminal 410 has the first end portion 46 that extends in the first extension direction orthogonal to the lamination direction of the current collector foils 21, and the second end portion 47 that extends from the end of the first end portion 46 in the second extension direction orthogonal to both the lamination direction of the current collector foils 21 and the first extension direction, has a smaller length than the first end portion 46, and forms the cutout 44 with the first end portion 46. The second end portion 47 includes the base part 48, and the thin-walled part 49 that protrudes from the base part 48 in the first extension direction and has a smaller thickness than the base part 48 in the lamination direction of the current collector foils 21. The secondary cell manufacturing method further includes the step of welding the plurality of current collector foils 21 to the current collector terminal 410 by scanning the plurality of current collector foils 21 disposed in the cutout 44 with a laser beam as an energy beam along the first extension direction toward the second end portion 47 while irradiating the plurality of current collector foils 21 with the laser beam. In the step of welding together the plurality of current collector foils 21 to the current collector terminal 410, the plurality of current collector foils 21 disposed in the cutout 44 and the thin-walled part 49 are fused.

The secondary cell 10 of this embodiment includes the plurality of laminated current collector foils 21, and the current collector terminal 41 that is placed on the plurality of laminated current collector foils 21 in the lamination direction thereof. The cutout 44 is formed in the current collector terminal 41. The current collector terminal 41 has the first end portion 46 that extends in the first extension direction orthogonal to the lamination direction of the current collector foils 21, and the second end portion 47 that extends from the end of the first end portion 46 in the second extension direction orthogonal to both the lamination direction of the current collector foils 21 and the first extension direction, has a smaller length than the first end portion 46, and forms the cutout 44 with the first end portion 46. The secondary cell 10 further includes the weld 56 that is formed along the second end portion 47 as the plurality of current collector foils 21 and the current collector terminal 41 are welded together. At a position away from the second end portion 47 in the first extension direction, the plurality of current collector foils 21 protrude from the first end portion 46 in the second extension direction and have the fusion mark 52 at the protruding end.

According to the manufacturing method of the secondary cell 10 and the secondary cell 10 of the first embodiment of the present disclosure thus configured, damage to the current collector foils 21 of the electrode 20 can be prevented during the step of welding together the electrode 20 and the current collector terminal 410. Thus, it is possible to prevent an increase in resistance of the secondary cell 10 or a decrease in weld strength of the electrode 20 and the current collector terminal 41.

The electrode 20 of a rolled type has been described in this embodiment, but the present disclosure is not limited to this example; the electrode may be of a laminated type with a positive current collector foil and a negative current collector foil repeatedly laminated through a separator. In this embodiment, the second end portion 47 of the current collector terminal 41 has a stepped structure formed by the base part 48 and the thin-walled part 49, but the present disclosure is not limited to this configuration. For example, the thin-walled part may have a tapered structure in which the thickness of the thin-walled part decreases gradually in the direction away from the base part. Instead of a laser beam, an electron beam may be used in the step of welding together the electrode 20 and the current collector terminal 410.

(Second Embodiment)

Figure 13:
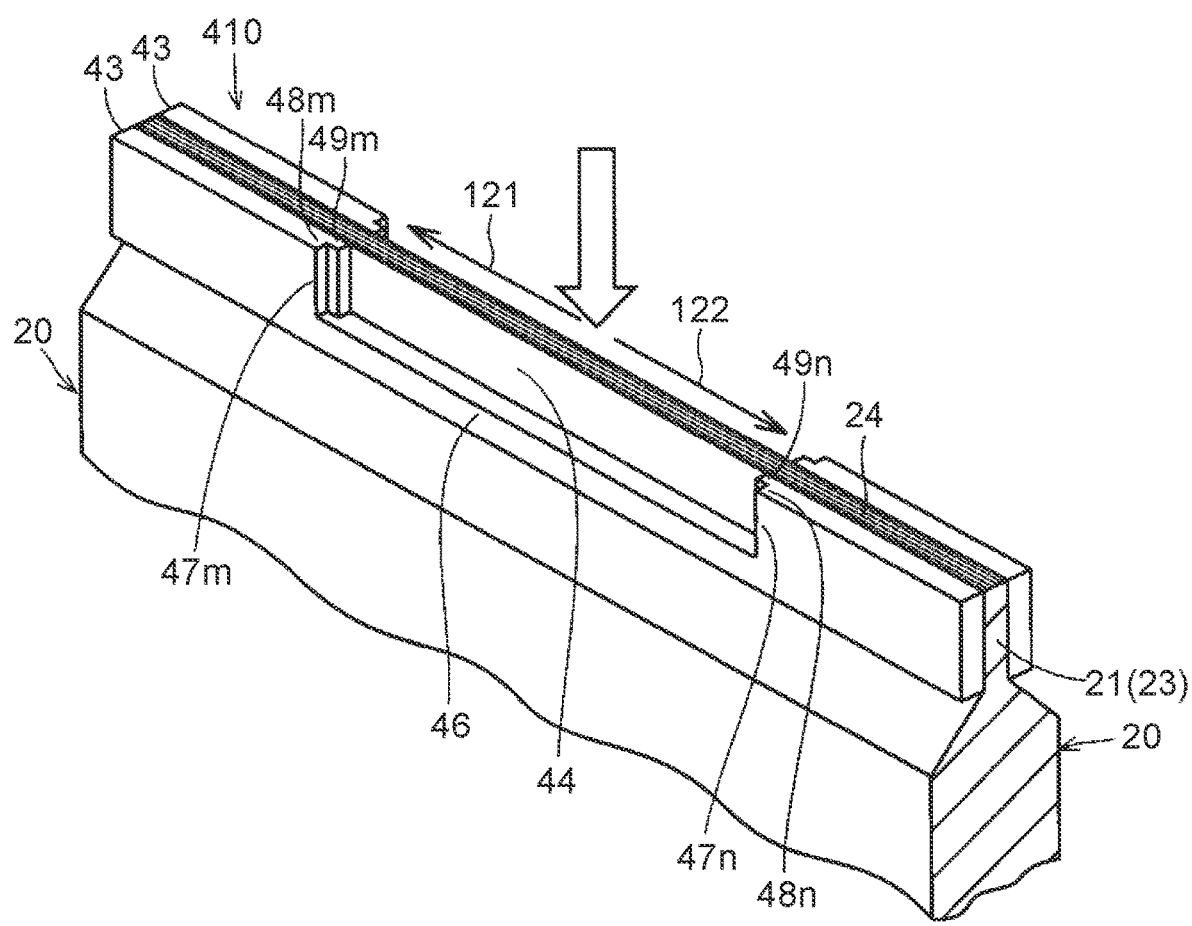
FIG. 13 is a perspective view showing a step in a secondary cell manufacturing method of a second embodiment.

FIG. 13 is a perspective view showing a step in a secondary cell manufacturing method of a second embodiment of the present disclosure. FIG. 13 is a view corresponding to FIG. 7 of the first embodiment. The secondary cell manufacturing method of the second embodiment has basically the same configuration as the secondary cell manufacturing method of the first embodiment. In the following, description of the components common to both embodiments will be omitted.

Referring to FIG. 13, in this embodiment, the current collector terminal 410 has the first end portion 46, a second end portion 47m, and a third end portion 47n.

The first end portion 46 and the second end portion 47m correspond respectively to the first end portion 46 and the second end portion 47 of the first embodiment.

The third end portion 47n faces the second end portion 47m in the first extension direction of the first end portion 46. The third end portion 47n extends from an end of the first end portion 46 in a direction orthogonal to both the lamination direction of the current collector foils 21 and the first extension direction. The third end portion 47n extends from the first end portion 46 toward the end 24 of the current collector foils 21. The third end portion 47n extends parallel to the second end portion 47m. The cutout 44 is formed by the first end portion 46, the second end portion 47m, and the third end portion 47n.

The second end portion 47m has a base part 48m and a thin-walled part 49m. The base part 48m and the thin-walled part 49m correspond respectively to the base part 48 and the thin-walled part 49 of the first embodiment. The third end portion 47n has a base part 48n and a thin-walled part 49n. The base part 48n and the thin-walled part 49n are provided in the same forms as the base part 48m and the thin-walled part 49m, respectively, of the second end portion 47m.

In the step of welding together the electrode 20 and the current collector terminal 410, the plurality of current collector foils 21 disposed in the cutout 44 are scanned with a laser beam along the first extension direction toward the second end portion 47m while being irradiated with the laser beam (scanning in the direction indicated by an arrow 121). In this welding step, the plurality of current collector foils 21 disposed in the cutout 44 and the thin-walled part 49m are fused.

Next, the plurality of current collector foils 21 disposed in the cutout 44 are scanned with a laser beam along the first extension direction toward the third end portion 47n while being irradiated with the laser beam (scanning in the direction indicated by an arrow 122). In this welding step, the plurality of current collector foils 21 disposed in the cutout 44 and the thin-walled part 49n are fused.

Compared with the secondary cell 10 of the first embodiment, the secondary cell manufactured by the secondary cell manufacturing method of this embodiment has an additional weld that is formed along the third end portion 47n.

According to the secondary cell manufacturing method of the second embodiment thus configured, effects similar to those described in the first embodiment can be achieved. In addition, since the joint area of the electrode 20 (current collector foils 21) and the current collector terminal 41 is increased, this embodiment has more remarkable effects of enhancing the weld strength and reducing the cell resistance. Thus, the secondary cell can be further improved in reliability against falls and vibrations as well as in electric characteristics.

(Examples)

Figure 14:
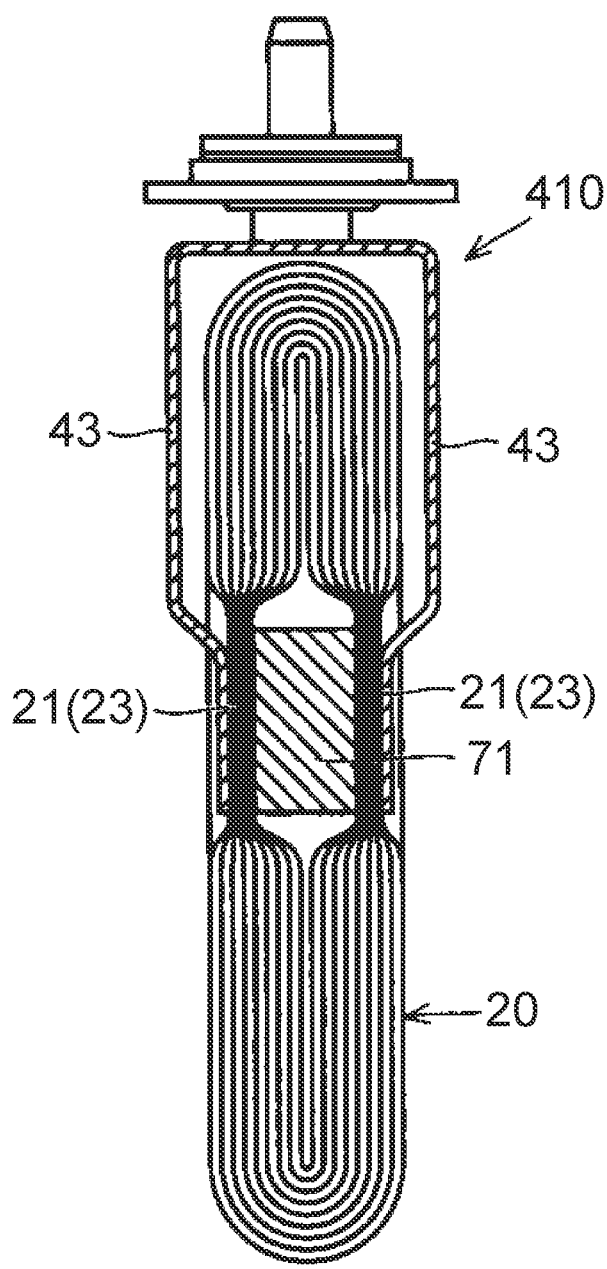
FIG. 14 is a side view showing a structure for connecting the electrode and the current collector terminal to each other in Example 1.
Figure 15:
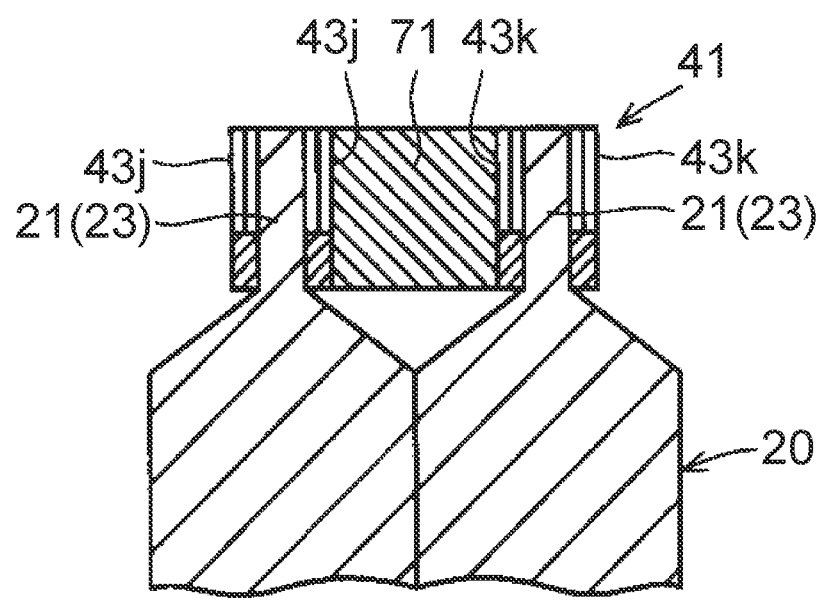
FIG. 15 is a sectional view showing the structure for connecting the electrode and the current collector terminal to each other in Example 1.

FIG. 14 is a side view showing a structure for connecting the electrode and the current collector terminal to each other in Example 1. FIG. 15 is a sectional view showing the structure for connecting the electrode and the current collector terminal to each other in Example 1.

Referring to FIG. 14 and FIG. 15, in this example, a 15 μm-thick aluminum foil (or aluminum-alloy foil) was used as the positive current collector foil 21P, and a 10 μm-thick copper foil was used as the negative current collector foil 21N. A layer of a positive active material mixture and a layer of a negative active material mixture were formed respectively on the surfaces of the positive current collector foil 21P and the negative current collector foil 21N.

The positive current collector foil 21P and the negative current collector foil 21N were cut into a predetermined size. The positive current collector foil 21P and the negative current collector foil 21N were laminated through a porous insulation layer as the separator 29, and the obtained laminate was rolled to produce the electrode 20 of FIG. 2.

Figure 16:
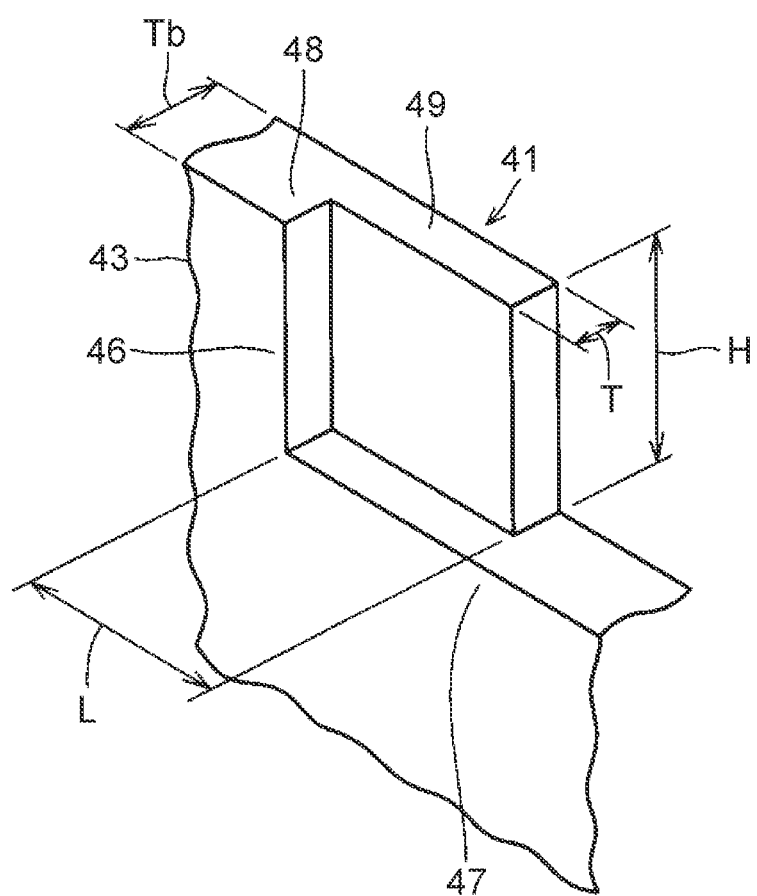
FIG. 16 is an enlarged perspective view of a second end portion of the current collector terminal of Example 1.

FIG. 16 is an enlarged perspective view showing the second end portion of the current collector terminal in Example 1. In this example, a 1.0 mm-thick aluminum sheet was used to produce the positive current collector terminal 410 of FIG. 7, and a 1.0 mm-thick copper sheet was used to produce the negative current collector terminal 410 of FIG. 7. As shown in FIG. 16, the thickness Tb of the base part 48 was 1.0 mm; the thickness T of the thin-walled part 49 was 0.5 mm; a length H of the thin-walled part 49 protruding from the base part 48 was 2.0 mm; and a width L of the thin-walled part 49 in the direction orthogonal to the protrusion direction was 2.0 mm.

Referring to FIG. 14 and FIG. 15, a core 71 was inserted into the electrode 20 so as to divide the current collector foils 21 to the left and right sides from the center of the roll of the electrode 20. In this modified example, a current collector terminal 410 with a pair of arms 43j and a pair of arms 43k provided in parallel was used. The plurality of current collector foils 21 divided by the core 71 to one side were clamped by the pair of arms 43j, while the plurality of current collector foils 21 divided by the core 71 to the other side were clamped by the pair of arms 43k.

The step of welding together the electrode 20 and the current collector terminal 410 was performed in accordance with the secondary cell manufacturing method described in the first embodiment. The positive terminal was welded with a fiber laser under the conditions of the output power 2000 W and the scanning speed 20 mm/sec. The negative terminal was welded with a fiber laser under the conditions of the output power 3000 W and the scanning speed 10 mm/sec.

Figure 17:
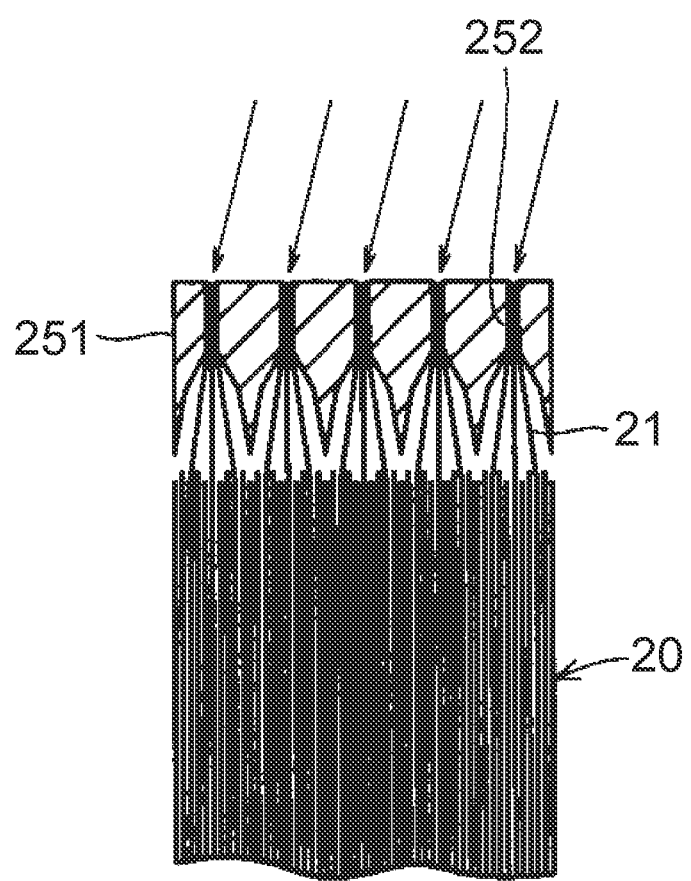
FIG. 17 is a sectional view showing a step of welding together an electrode and a current collector terminal in Comparative Example 1.
Figure 18:
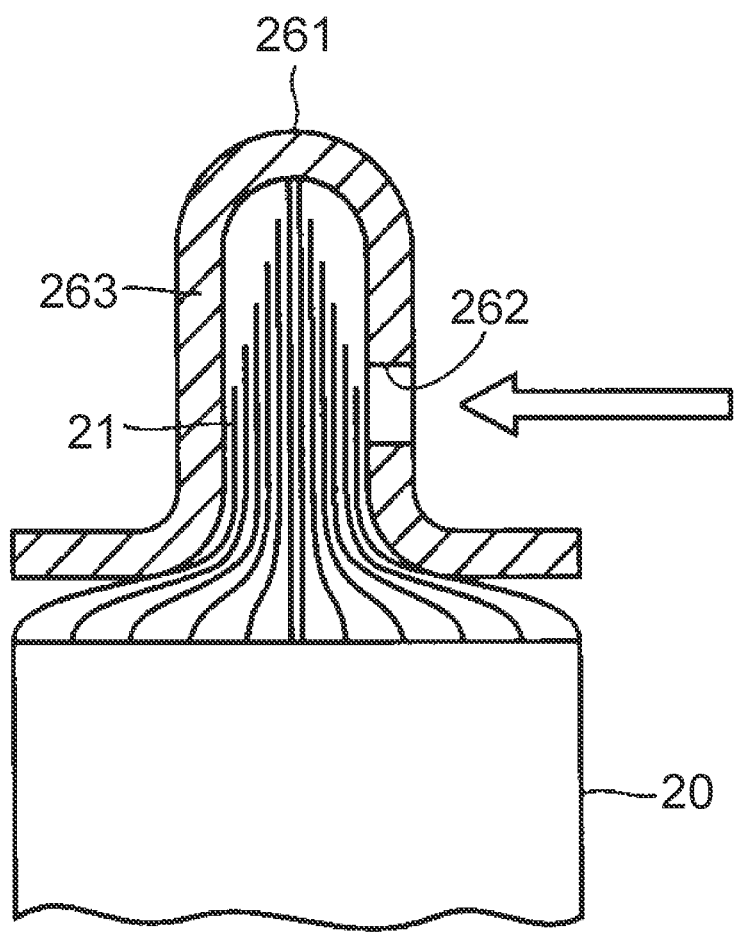
FIG. 18 is a sectional view showing a step of welding together an electrode and a current collector terminal in Comparative Example 2.

FIG. 17 is a sectional view showing a step of welding together an electrode and a current collector terminal in Comparative Example 1. FIG. 18 is a sectional view showing a step of welding together an electrode and a current collector terminal in Comparative Example 2.

Referring to FIG. 17 and FIG. 18, in both Comparative Example 1 and Comparative Example 2, the electrodes 20 were produced by the same steps as in Example 1.

As shown in FIG. 17, in Comparative Example 1, the peripheral edge portions of the current collector foils 21 were inserted into constricted portions of a current collector (current collector terminal) 251 provided with slits 252, and the leading ends of the peripheral edge portions of the current collector foils 21 were protruded from the slits 252. The peripheral edge portions of the current collector foils 21 protruding from the slits 252 were scanned with a laser beam to thereby weld together the electrode 20 and the current collector 251. The current collector 251 used was 1.5 mm thick and made of aluminum for a positive electrode, with the slits 252 having a width of 0.2 mm. The current collector 251 used was 1.5 mm thick and made of copper for a negative electrode, with the slits 252 having a width of 0.2 mm.

As shown in FIG. 18, in Comparative Example 2, the peripheral edge portions of the current collector foils 21 were inserted into a folded part 263 of a retainer plate 261 (current collector terminal). The peripheral edge portions were irradiated with a laser beam through a slit hole 262 formed in the retainer plate 261 to thereby weld together the electrode 20 and the retainer plate 261. The retainer plate 261 used was a 1.0 mm-thick aluminum sheet bent into an inverted U-shape for the positive electrode. The retainer plate 261 used was a 1.0 mm-thick copper sheet bent into an inverted U-shape for the negative electrode.

Thirty secondary cells each of Example 1, Comparative Example 1, and Comparative Example 2 were produced by the respective secondary cell manufacturing methods having been described above.

FIG. 19 is a table showing evaluation results of the secondary cells of Example 1, Comparative Example 1, and Comparative Example 2. Referring to FIG. 19, first, the charging and discharging performance of the secondary cells produced was evaluated. As shown in FIG. 19, when Example 1, Comparative Example 1, and Comparative Example 2 were compared, the cell capacity of the secondary cell of Example 1 was 5% higher than the cell capacities of the secondary cells of Comparative Example 1 and Comparative Example 2. This is because the length of protrusion of the current collector foils from the separator that is required in the welding step is smaller in Example 1.

Next, a vibration test was conducted on the secondary cells produced. After the vibration test, the secondary cells were disassembled to check the state of the weld between the current collector terminal and the current collector foils. In the secondary cells of Comparative Example 1, the current collector foils 21 were torn and the weld strength was thereby reduced. A possible explanation is that, during the step of welding together the electrode 20 and the current collector 251, the current collector foils 21 located below the position of protrusion from the slits 252 were each subjected to tensile stress. On the other hand, in some of the secondary cells of Comparative Example 2, pores were formed in part of the weld between the current collector foils 21 and the retainer plate 261 due to an excessive heat input during the welding step, while in others some of the current collector foils 21 failed to be joined due to an insufficient heat input during the welding step. In the secondary cells of Example 1, by contrast, such defects attributable to welding of the current collector terminal 410 and the current collector foils 21 were effectively prevented.

FIG. 20 is a table showing evaluation results of secondary cells of Example 2. Referring to FIG. 20, in Example 2, the secondary cells were produced in accordance with the secondary cell manufacturing method of Example 1. In this case, the lamination thickness t of the current collector foils 21 was 0.5 mm, and the thickness Tb of the base part 48 in the current collector terminal 410 was 1 mm. The value of the thickness T of the thin-walled part 49 in the current collector terminal 410 was varied within the range of 0.05 mm to 0.75 mm so as to vary the value of T/t as shown in FIG. 20.

In FIG. 20, those secondary cells of which the weld between the current collector foils 21 and the current collector terminal 41 was of higher quality are marked with A, and those of which the weld was of somewhat lower quality are marked with B. As shown in FIG. 20, when the relation $0.5 \leq T/t \leq 1.1$ was satisfied, the weld between the current collector foils 21 and the current collector terminal 41 had higher quality.

The embodiments disclosed herein should be construed as in every respect merely illustrative and not limitative. The scope of the present disclosure is defined not by the above description but by the claims, and is intended to include all possible modifications equivalent in meaning and scope to the claims.

The present disclosure is mainly applied to secondary cells for which welding is employed to join together the current collector foils and the current collector terminal.

What is claimed is:

1. A secondary cell manufacturing method comprising:
   placing a current collector terminal on a plurality of laminated current collector foils from a lamination direction of the current collector foils,
   the current collector terminal having a first end portion that extends in a first extension direction orthogonal to the lamination direction of the current collector foils, and a second end portion that extends from an end of the first end portion in a second extension direction orthogonal to both the lamination direction of the current collector foils and the first extension direction, has a length in the second extension direction smaller than a length of the first end portion in the first extension direction, and a cutout bounded by the first end portion and the second end portion that partially exposes the current collector foils disposed at ends in the lamination direction of the current collector foils,
   the second end portion including a base part, and a thin-walled part that protrudes from the base part in the first extension direction and has a smaller thickness than the base part in the lamination direction of the current collector foils, wherein the thin-walled part is located at a part of the second end portion that abuts the cutout; and
   welding the plurality of current collector foils to the current collector terminal by scanning the plurality of current collector foils disposed in the cutout with an energy beam along the first extension direction toward the second end portion while irradiating the plurality of current collector foils with the energy beam, wherein
   under the state that the plurality of current collector foils have been welded to the current collector terminal, the plurality of current collector foils disposed in the cutout that are adjacent to the thin-walled part of the second end portion are fused with the thin-walled part of the second end portion, while the plurality of current collector foils that are located under the first end portion are not welded together.

2. The secondary cell manufacturing method according to claim 1, wherein
   when the current collector terminal is placed on the plurality of laminated current collector foils, a ratio of a thickness T of the thin-walled part in the lamination direction of the plurality of current collector foils to a thickness t of the current collector foils in the lamination direction of the plurality of current collector foils satisfies a relation $0.5 \leq T/t \leq 1.1$.

3. The secondary cell manufacturing method according to claim 1, wherein
   when the current collector terminal is placed on the plurality of laminated current collector foils, a ratio of a thickness T of the thin-walled part in the lamination direction of the plurality of current collector foils to a thickness t of the current collector foils in the lamination direction of the plurality of current collector foils satisfies a relation $0.6 \leq T/t \leq 0.9$.

4. The secondary cell manufacturing method according to claim 1, wherein
   the current collector terminal further has a third end portion that is disposed so as to face the second end portion in the first extension direction, extends in a direction orthogonal to both the lamination direction of the current collector foils and the first extension direction, and forms a boundary for the cutout along with the first end portion and the second end portion,
   the third end portion includes a base part, and a thin-walled part that protrudes from the base part in a direction opposite from the first extension direction and has a smaller thickness than the base part in the lamination direction of the current collector foils, wherein the thin-walled part is located at a part of the third end portion that abuts the cutout, and
   when the plurality of current collector foils are welded to the current collector terminal, the plurality of current collector foils disposed in the cutout are further scanned with an energy beam along the first extension direction toward the third end portion while being irradiated with the energy beam.

5. The secondary cell manufacturing method according to claim 1, wherein
   the second end portion has such a stepped structure that the thickness of the second end portion in the lamination direction of the current collector foils changes discontinuously from the base part toward the thin-walled part.

6. A secondary cell comprising:
   a plurality of laminated current collector foils;
   a current collector terminal placed on the plurality of laminated current collector foils in a lamination direction thereof,
   the current collector terminal having a pair of arms that connect to the plurality of laminated current collector foils, wherein each of the arms have a first end portion that extends in a first extension direction orthogonal to the lamination direction of the current collector foils, and a second end portion that extends from an end of the first end portion in a second extension direction orthogonal to both the lamination direction of the current collector foils and the first extension direction, has a length in the second extension direction smaller than a length of the first end portion in the first extension direction, and a cutout bounded by the first end portion and the second end portion; and
   a weld formed along the second end portion where the plurality of current collector foils and the current collector terminal are welded together,
   wherein at a position away from the second end portion in the first extension direction, the plurality of current collector foils protrude from the first end portion in the second extension direction and have a fusion mark at a protruding end of the plurality of current collector foils, wherein the fusion mark extends along the first extension direction and one end of the fusion mark is located at the weld, and in an area where the fusion mark extends, the arms of the current collector and the plurality of current collector foils are not welded together.

7. The secondary cell according to claim 6, wherein
   the current collector terminal further has a third end portion that is disposed so as to face the second end portion in the first extension direction, extends in a direction orthogonal to both the lamination direction of the current collector foils and the first extension direction, and forms a boundary for the cutout along with the first end portion and the second end portion, and the secondary cell further comprises a weld formed along the third end portion as the plurality of current collector foils and the current collector terminal are welded together.

* * * * *